United States Patent [19]

Pedersen

[11] 4,154,983
[45] May 15, 1979

[54] LOOP CARRIER SYSTEM FOR TELECOMMUNICATION AND DATA SERVICES

[75] Inventor: Thomas J. Pedersen, Lincroft, N.J.

[73] Assignee: Bell Telephone Laboratories, Incorporated, Murray Hill, N.J.

[21] Appl. No.: 886,267

[22] Filed: Mar. 13, 1978

[51] Int. Cl.² ............................................ H04Q 11/04
[52] U.S. Cl. ........................ 179/15 AL; 179/15 BA; 179/15 BV
[58] Field of Search ........ 179/15 AL, 15 BA, 15 AT, 179/15 BV; 340/147 R

[56] References Cited

U.S. PATENT DOCUMENTS

| | | | |
|---|---|---|---|
| 3,529,089 | 9/1970 | Davis et al. | 179/15 AL |
| 3,597,549 | 8/1971 | Farmer et al. | 179/15 AL |
| 3,988,545 | 10/1971 | Fuemmerle et al. | 179/15 BV |

*Primary Examiner*—Kathleen H. Claffy
*Assistant Examiner*—Joseph A. Popek
*Attorney, Agent, or Firm*—John Francis Moran

[57] ABSTRACT

A versatile loop communication system is disclosed wherein recurring frames of the ring carrier signal are divided by a movable partition into a dynamically allocated time division channel portion and a data packet communication portion. A common signal channel, in the ring carrier frame, is used to logically connect and disconnect stations for either circuit or packet communication on a common bus extending from terminals located in the loop. The loop controller automatically forms a contiguous group of time division channels or signal bytes at one end of the ring carrier frame. The format of the time division multiplexing channels is such that dynamic time slot interchanges of signal bytes are produced by the controller without the necessity of counting circuitry in the terminals to identify specific channel locations. The dynamic time slot interchange or byte displacement function is provided by additional memory arrangements both for the signals being transported by the ring and control functions in the time division switch located in the controller. The remaining portion of the frame serves as a shared channel for packet header switched data. In order to provide a flexible basis for packet switching, the controller assigns address tags and retains a map of the system.

9 Claims, 14 Drawing Figures

| FIG. 6 |
| FIG. 8 |
| FIG. 9 |

LOOP CARRIER SYSTEM FOR TELECOMMUNICATION AND DATA SERVICES

BACKGROUND OF THE INVENTION

This invention relates generally to digital message transmission systems and, more particularly, to common carrier systems utilizing multichannel time division multiplexing that efficiently combine packet or message switched data and circuit switched telecommunication messages.

Recently, various multiplexing arrangements have been introduced that combine digital traffic which is switched in different ways to provide an arrangement for sharing the capacity of digital transmission systems. At this level of hierarchy, in digital transmission systems the digital traffic is already processed to provide effective utilization of transmission capacity. Part of the information is generated using concentration techniques and processed by circuit switching (line switching). Digital data is processed by store-and-forward switching which is also called message switching or packet switching. In circuit switching, devices are first connected to provide a "transparent" channel through which fixed quantities of information are transmitted at fixed intervals irrespective of activity. This type of communication is ideally suited for the synchronous traffic utilized by various telecommunication services. In packet switching, devices share channels to send and receive information in the form of message blocks or packets on a demand basis. The data packets are stored in buffers and transmitted asynchronously when space becomes available. An advantage of packet switched device is that they may remain logically connected to a transmission channel but do not use any of its capacity while not communicating. This type of communication conserves transmission at the expense of message-by-message processing to provide "virtual" channels desirable for data services that transmit information at high rates at irregularly occuring intervals.

The combination of these two different switching processes at the lowest level of hierarchy or at the user level produces a number of considerations, particularly in connection with a loop or ring transmission system. One of many typical applications is in the environment of the business community wherein both telecommunication services and data services are required. There are obvious advantages if both can be conveniently offered by a single common carrier communication system. However, conventional analog telecommunication systems require numerous wire pairs that are inefficient since most are idle at any given time, the wiring is awkward to rearrange, and only suitable for the voice type communication or low data communication rates. Unfortunately, conventional digital subscriber carrier systems are designed for voice generated digital traffic assigned to fixed time slots which render them unsuitable for high data rate transmission.

A primary object of this invention is to provide a digital system robust enough to handle present service offerings for voice and data without compromising performance and have sufficient flexibility to provide conveniently for needs of future service offering as well.

Another object of the invention is to provide a packet communication facility at the user level on a common carrier communication system.

A related object is to provide an efficient time division multiplexing arrangement which may be used alone for the telecommunication services or in combination with data services.

SUMMARY OF THE INVENTION

Broadly, the invention takes the form of a common carrier system at the subscriber level wherein data and telecommunication sets may efficiently communicate. In the various aspects of the invention, a control terminal provides recurring frames on a transmission loop that serially connects together a plurality of terminals. Each terminal serves a plurality of telecommunication stations and data stations. The control terminal interchanges the order of incoming signal bytes in a frame with respect to an outgoing frame to provide a contiguous group of circuit-switched signal bytes. The order of the signal bytes in the contiguous group corresponds to the location of the actively communicating telecommunication stations while the remaining contiguous portion of the frame may be used to communicate by store-and-forward messages. A predetermined byte in each frame serves as a common signaling channel for all of the stations.

In some of the further aspects of the invention, the control terminal includes a marker bit and a plurality of information bytes in each signal byte. At the telecommunication stations that are activated through the common signaling channel, the marker bit is changed to a second polarity so that each of the activated stations extracts bytes with the first signal byte it receives with a marker bit of a first polarity. In order to partition the frame between telecommunication messages and store-and-forward messages, the control terminal issues a marker of the second polarity in the first signal byte of a store-and-forward message. The first signal byte follows an extra signal byte with a marker bit of the first polarity. The control terminal includes an output memory arrangement for providing frames for the loop and an input memory arrangement for receiving the return frames from the loop. Each of the memory arrangements has a plurality of sections so that as one section is participating in the active switching function of the control terminal the other section is assembling signal bytes in an order responsive to the signaling activities in the system for the next successive frame. A gating network completes signal paths between the memory sections for the signal bytes in the frames. The control terminal also includes a subsystem which loops around the gating network and is configured to perform a switch-store-switch operation wherein complete store-and-forward messages are retained.

DETAILED DESCRIPTION

Of the two types of communication switching, the queued circuit communication technique will be discussed first. This discussion will then serve as a basis for the discussion of the packet communication technique. The queued circuit communication switching presented herein is an independent concept and both types of communication switching are dependent upon each other, as herein presented, only to the extent of compatibly sharing a common transmission facility.

Figure 1:
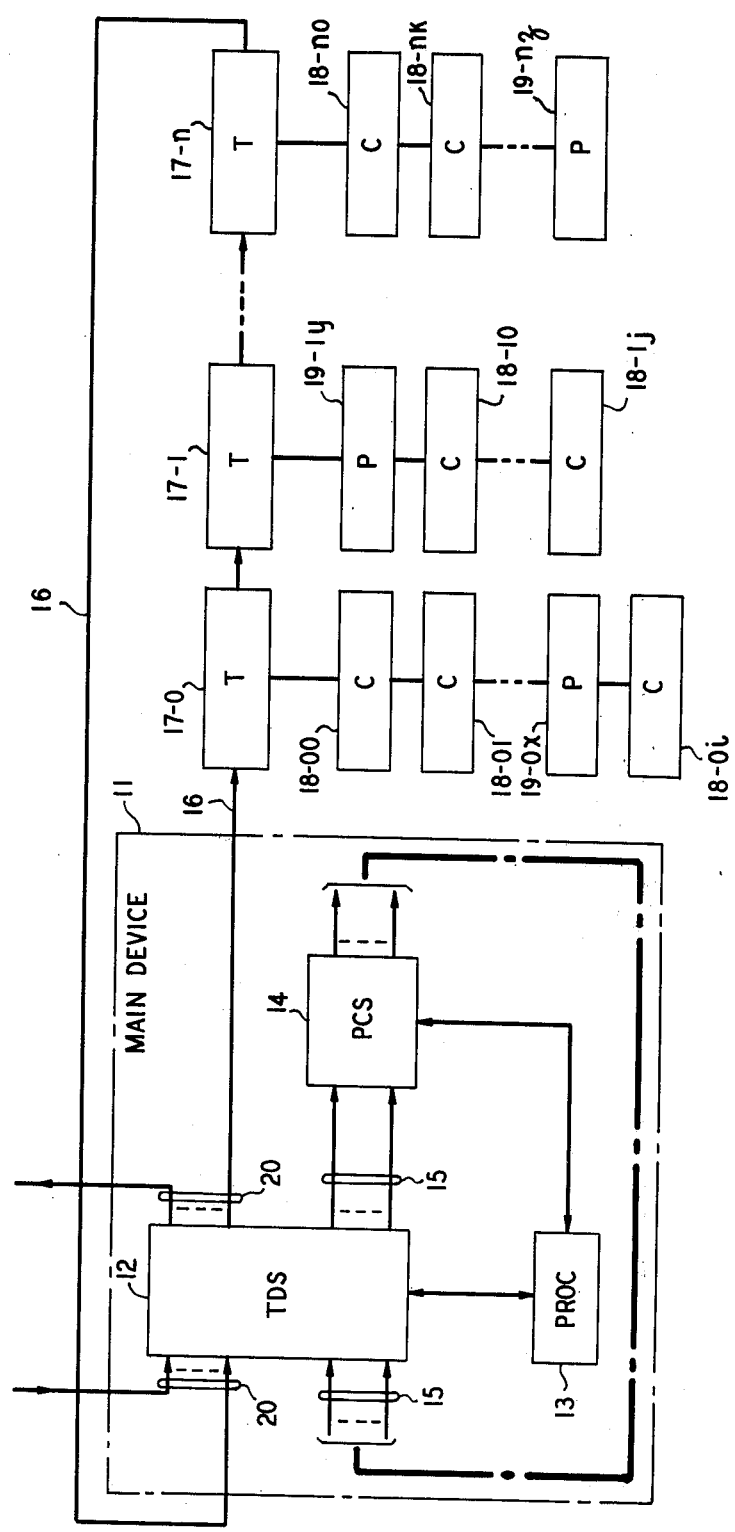
FIG. 1 is a block diagram of a loop transmission facility which combines packet switched data and circuit switched telecommunication messages.

FIG. 1 is a diagram of a loop transmission facility which provides both types of communication switching. The primary element of FIG. 1 is main device 11 which provides the service of a common carrier central office. Device 11 includes time division switch (TDS) 12 and processor 13 which obtains signaling information from switch 12 and utilizes this information to control the operation of the switch. Connected to switch 12 and processor 13 is packet communication subsystem (PCS) 14 which provides the necessary switching for packet or message processing. As is evident from FIG. 1 there are a plurality of inputs and outputs to switch 12 designated 20 and labeled 15 for those associated with subsystem 14, which are utilized to indicate that a plurality of loops or rings may be simultaneously served by device 11.

Also shown in FIG. 1 is an illustrative loop comprising a plurality of terminals 17 designated with the letter T which provide either or both packet and circuit switching services at their respective locations. Switch 12 provides recurring outgoing frames on cable 16 that propagate through serially connected terminals 17-0 through 17-n. Associated with each of terminals 17-n is from one to a plurality of circuit station service modules 18 each designated with the letter C and are referred to hereinafter as C-stations. In this illustrative configuration, there are 18-00 through 18-0i C-stations associated with terminal 17-0. Also connected in the group of the C-stations associated with terminal 17-0 is a packet station service module labeled P and referred to as a P-station. P-stations may be data sources and/or data sinks. Terminal 17-0 may service a plurality of P-stations which is illustratively indicated by the reference numeral 19-0x in FIG. 1. It is pointed out that the first digit after the reference numeral 18 of a C-station denotes the terminal association while the second digit denotes the position of a C-station relative to the other C-stations at a particular terminal site. This numbering technique generally applies to the P-stations which each symbolically represents a plurality of their kind that may assume any position among and mingle with the C-stations. It is alo to be understood that module construction is utilized throughout FIG. 1 so that all T terminals are identical to each other and similarly the same applies to all the C-stations and to all the P-stations among their respective groups.

The next terminal connected in the ring is 17-1 which has associated with it y P-stations and j C-stations. The last terminal in the ring is terminal 17-n which is coupled to k C-stations and z P-stations. It should be also understood that although the various C-stations and P-stations are simply shown as single units connected to their respective terminals in FIG. 1, each of these stations has associated with it a second component removed therefrom and located at a convenient service location.

Figure 2:
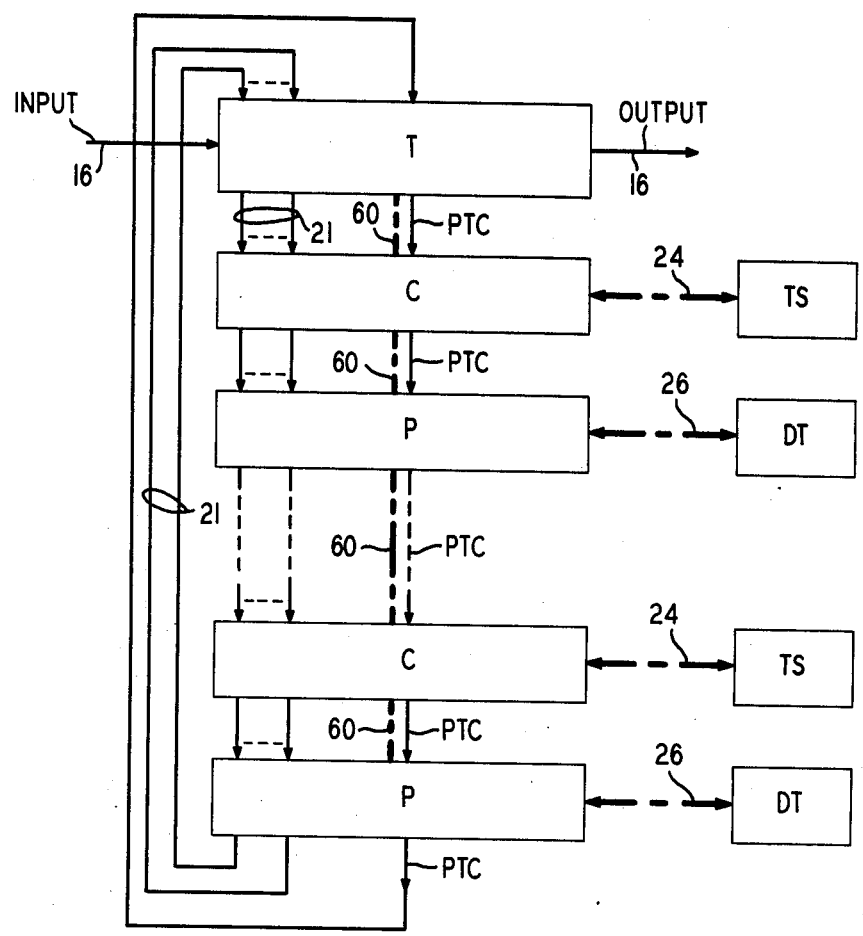
FIG. 2 is block diagram of a terminal unit of FIG. 1.

FIG. 2 illustrates this arrangement in further detail for a typical terminal of FIG. 1. The stations connected to the T-terminals are basically included in parallel bus 21. Bus 21 is a high speed bus which is closed or looped back to the T-terminal in FIG. 2. Connected to each station is bus 21 is either a telecommunications set (TS) or a data terminal (DT) set for each of the respective C-stations or P-stations. Although these remote components are simply shown to the right of the terminal site in FIG. 2, the TS and DT components actually are conveniently located at the site of the desired service. In such cases, cables 24 or 25 provide either an analog or digital link between the TS and DT sites and the terminal site. Portions of the frames defined by device 11 are selectively routed on buses corresponding to bus 21 at each T-terminal site so that the actively communicating stations may receive and/or transmit information.

Figure 3:
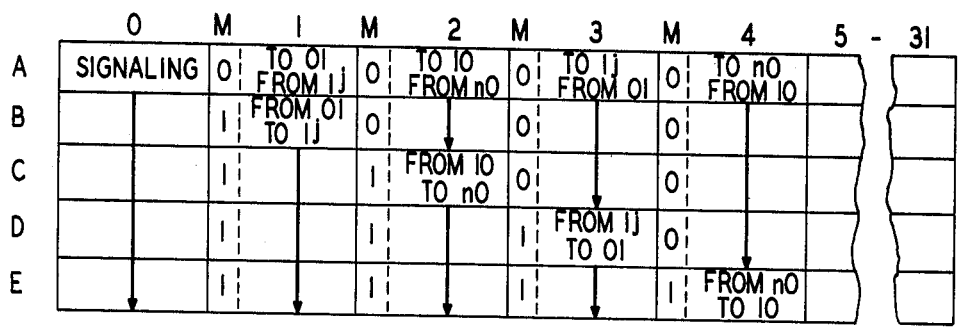
FIGS. 3, 4 and 5 are illustrative frames of digital signals used in the facility.

In FIG. 3, an illustrative frame of digital signals is depicted at successive locations as it propagates through the illustrative loop depicted in FIG. 1. Each frame is divided into 32 bytes. Each byte includes 8 information bits and a marker or flag bit. At the beginning of each byte after the first byte is the marker bit that is followed by the information bits. The first byte in each frame serves as a common signaling channel. A primary purpose of the signaling channel is to connect and to disconnect C-stations and P-stations so that only the actively communicating units are activated by being "logically connected" to the carrier signal on the ring of FIG. 1.

In FIG. 3, line A denotes the outgoing frame from switch 12 on cable 16 wherein the next four bytes after the signaling byte are used for circuit communication. In accordance with the common channel signaling procedure, only those C-stations that are actively communicating are logically connected for interacting with the ring carrier signal. At this point in time, the necessary signaling operations to effect those connections have already occurred. As the frame emerges from switch 12, all of the M (marker) bits are of one polarity or "0." The information bits in byte one, which is the first information byte of the frame, originate from C-station 1j and are destined for C-station 01 which respectively stand for C-stations 18-1j and 18-01 of FIG. 1. The next byte or byte two contains information bits from C-station 18-n0 which are destined for C-station 18-10. Byte three contains information bits from C-station 18-01 to 18-1j. The final byte with information bits provides returned C-station communication from 18-10 to 18-n0. After interaction of terminal 17-0 and C-station 18-01, the frame is changed in main device 11 and emerges as depicted in line B of FIG. 3. Since C-station 18-01 was previously logically activated by the common signaling channel, it seizes the first byte with a "0" marker bit. It then extracts the information bits in the byte and changes the marker bit to a "1" while replacing the received information with information that is to be returned in the same byte.

In accordance with FIG. 3, there is a total of four C-stations actively communicating. As the frame emerges from switch 12, the first information byte is destined for the active C-station nearest to the output side of the switch. Therefore, C-station 18-01 simply interacts with the first information byte with a "0" marker bit. This marker bit is changed to a "1" by C-station 18-01 so that the next information byte destined for the next C-station is the first information byte with a "0" marker bit. The same technique is used by the subsequent C-stations that each had previously been activated through the common signaling channel.

When a C-station requests a call setup, any one of a number of well known techniques using the common signaling byte is utilized to alert switch 12 of the request. As is also known in the art, the use of a common signaling channel particularly as described hereinafter is not limited to providing connects and disconnects and may readily provide other functions and features to advantage for transmission systems. If the requesting C-station is located between actively communicating C-stations, switch 12 will now produce a new frame on conductor 16. For example, if C-station 18-0i is requesting the call setup, the second information byte or byte two is the channel utilized for that station. The result is that information which formerly occupied bytes 2, 3 and 4 is displaced to bytes 3, 4 and 5. C-station 18-0i is then signaled over the common channel to connect at the beginning the first frame in which the displacement occurs to insure continuity between the other C-stations that are actively communicating.

In order to perform the byte displacement or interchange, switch 12 is a store-switch-store network basically similar to that used in the Bell System's No. 4 Electronic Switching System but differing in a number of details that will be described hereinafter. A feature of switch 12 is that the cross-office time slot assigned a given call is independent to the ring time slots. Therefore, changes in ring time slot occasioned by call setups and releases do not require corresponding changes in cross-office assignments. Call setup/release procedures are simplified by this property, and interconnection of queued-circuit rings with fixed-time-slot trunks does not produce special procedural problems.

Since each of the C-stations is not assigned a particular fixed byte in the frame, they do not require a time slot counter to determine byte location nor do they require a holding register for time slot assignment and a comparator to match the two. With this form of communication, a C-station requires only to be signaled to connect or disconnect using the common signaling channel (the first byte of the frame). Once connected and actively communicating, each of the C-stations simply interacts with the first byte that the M bit is "0."

Another feature of the queued form of circuit communication is that main device 11 is able to determine the number of logically connected C-stations by counting the number of marker bits changed from "0" to "1." Accordingly, improper connects and disconnects are detected should they occur. The ability to count the number of logically connected C-stations also aids in the call setup/release procedure to be discussed shortly. In the example wherein C-station 18-0i becomes active and byte displacement occurs in the frame, the added interaction with the ring carrier signal must be detected in the frame returned to device or office 11 by a count of the marker bits changed from "0" to "1" so that the displaced positions of received bytes are used properly. Connection of the other party in the call and assembly of the cross-office circuit are separate, independently timed operations. In the example, the four C-stations are communicating within the ring or intraring which is a special case wherein there is a double byte usage. From ring to ring or interring, byte usage ignoring the unique assignment procedure corresponds to conventional time division multiplexing wherein a single byte of transmitted information is replaced with information for return transmission. The call release procedure is a complementary process of the call setup procedure.

Figure 4:
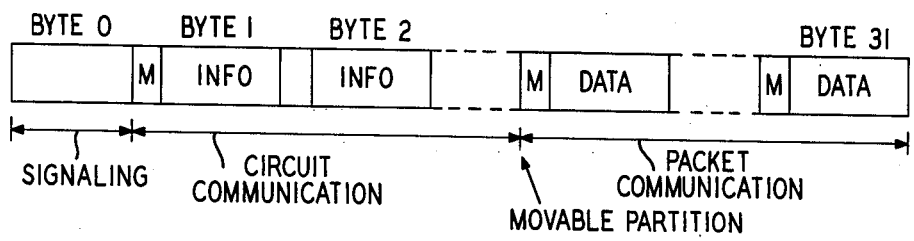

Up to this point, the ring carrier frame signal has only been discussed in terms of the circuit communication procedure which automatically packs a contiguous group of time division information bytes into the first part of the frame. FIG. 4 illustrates the manner in which the frame is divided to provide both circuit and packet communication. In FIG. 4, a movable partition follows the end of the circuit communication portion of the frame and marks the beginning of the packet communication portion. The actual manner used to carry out this result will be discussed hereinafter when the process of packet communication is described.

Although there are a variety of signaling formats that may be utilized in the system of FIG. 1, an advantageous signaling technique is to use sequential logical signals and finite state machines at the terminal and station sites. This technique minimizes the burden on capacity of the loop carrier signal necessary to perform signaling functions and provides self checking features which insure proper interaction between device 11 and the remote stations in the system. In order to minimize the size of the signaling channel, each call setup or release procedure will require a plurality of frames to complete these processes.

One advantageous addressing arrangement that may be readily utilized in the system of FIG. 1 is disclosed in U.S. Pat. No. 4,016,369 issued on Apr. 5, 1977, to me. In the application of this arrangement to the system of FIG. 1, each T-terminal alters the access message before passing the access message to a subsequent T-terminal. Such an arrangement allows the T-terminals to be identical to each other and respond to the same predetermined access message since each terminal is uniquely identified by its location in the system. Furthermore, since addressing may be performed sequentially in successive frames, the next frame may utilize a portion of the signaling channel to identify one of the particular C-stations associated with the terminal accessed in the previous frame. Utilization of the same signaling technique in this portion of the signaling channel for C-station identification enables all C-stations to be identical.

Figure 5:
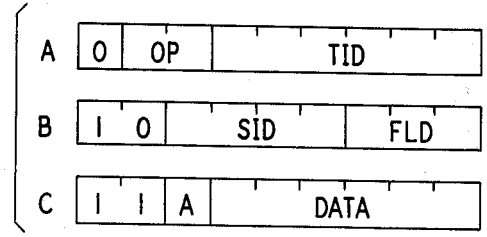

FIG. 5 serves to illustrate the application of this signaling technique used in conjunction with the queued form of circuit communication. In FIG. 5, signaling bytes are depicted for three successive frames of the ring carrier signal. The first signaling byte is illustrated by A of FIG. 5 and is identified by a "0" in the first bit position. The next two bits, designated OP, provide the following opcode instructions:

OP=instruction
00=vacant read
01=filled read
10=write
11=gate

The significance of these opcodes will become apparent from the discussion hereinafter. The remaining 6 bits specify the address of a T-terminal on the ring.

In the next frame, the signaling byte corresponds to B in FIG. 5. The leading two bits of "10" indicate that is the second byte of the three byte signaling sequence.

The next four bits, serve to identify a particular C-station among those associated with the specified T-terminal. The remaining bits form a 3-bit field which directs where (e.g., a register) within the C-station or P-station data is to be placed or where it originated. In FIG. 5, C represents the third byte of the signaling sequence which is indicated by the first two bits that are "11." The next bit provides an acknowledgment feature wherein device 11 sends a "0" that is inverted by any device which interacts with the 6-bit DATA field.

In this signaling arrangement, the number of addressable C-stations provided by the TID and SID fields is the product of 63 times 15. Accordingly, since only 31 communication bytes are available in a frame of the ring carrier signal, the system of FIG. 1 utilizes concentration to provide telecommunications services. The number of bits in each identifier field are design choices and may be readily changed by those skilled in the art to include more or less of the T-terminals on a particular ring and C-stations associated with a terminal. The same is true for the byte length and the number of bytes per frame. In this arrangement the large number of potential locations provides a high degree of flexibility through the number of possible C-stations and P-stations that may be associated with each terminal site.

When information from device 11 is directed to a C-station, the write opcode (OP=10) is used. In the first signaling byte, the opcode is sent with the T-terminal identify field (TID). In the second signaling byte of the next frame from device 11, the appropriate C-station identify (SID) and field (FLD) values are sent. The latter value may specify a register that will be used to record subsequent signaling information. Accordingly, the addressed C-station at the addressed T-terminal records the address match and the FLD value. In the final signaling byte to complete this operation in the third frame, the C-station records the DATA field and inverts the A bit. The data may be delivered to the addressed C-station itself (a FLD value is assigned to it), or it may be intended for the TS-set associated with the addressed C-station. The write operation is complete in itself in the former two operations. In the latter case, the information requires a gate opcode (OP=11) signaling sequence to be transferred to the associated TS or DT set.

When a gate opcode is being performed, other fields in the signaling byte do not serve their normal function. Upon detection of a gate opcode, the C-station which previously recorded FLD and DATA information before the present gate opcode transmits this information to its TS-set. As will be subsequently apparent from the description of the T-terminal and C-station of respective FIGS. 6 and 8, this information is transmitted using pulse width modulation (PWM). When reception is completed at the TS-set, the information is applied to one of the feature modules therein specified by FLD field. The feature module, for example, may be used to operate a digital display, lamp field, ringer, or similar features.

Origination of signaling at a set (e.g., due to a line button or a touch pad button depression) must eventually result in transmission to the CO. When such an event occurs, the set records the pertinent FLD and DATA in an internal register and then alerts the C-station by sending a single pulse to it. If the TS-set is in the process of receiving information from the C-station these actions occur a short time after reception is complete. When a gate opcode is received by an alerted C-station, the C-station will send a PWM sequence to its TS-set. If it has previously received data from device 11 as a result of a write operation as just described, it will send that data; otherwise it will send a sequence of 1's. The latter sequence causes no action at the station because FLD=7 happens to be assigned to the C-station. In either case, the TS-set sends back its originated FLD and DATA by returning one PWM pulse for each one it receives from the C-station. At this point, the C-station becomes a candidate for service on the ring.

To extract data from candidate C-stations, device 11 transmits signaling blocks with OP=00, and binary values of TID=63 and SID=15. At a T-terminal without any candidate C-stations the only action is to decrement the TID. Additional information on this addressing technique is disclosed in my previously cited patent. The other fields are passed unmodified. The first T-terminal which has a candidate C-station seizes the signaling block by changing the opcode from "00" to "01." That T-terminal and subsequent T-terminals pass the TID field unmodified. At the T-terminals which seized the block, C-stations preceding the first candidate decrement the SID field. The first candidate seizes the SID field by changing the leading "10" of the byte to "11"; subsequent C-stations thus treat the byte as data not intended for them. Finally, the C-station which seized the block applies data, inverts the A bit, and relinquishes its status as a candidate. Successive transmissions of read signaling blocks from device 11 thus cause successive candidate C-stations to apply data until all have been serviced, as indicated by reception of OP=00 at device 11. Although C-stations are served in order around the ring, none of the C-stations will receive preferential treatment because a gate sequence permits each candidate C-station to seize no more than one read signaling block. This feature is highly desirable in public utility applications.

A normal sequence of operations for device 11 is to extract and write, from a queue of waiting signaling information, at most one signaling block to each C-station. Device 11 then sends a gate block enabling this data to be sent to the TS-sets and at the same time enabling alerted C-stations to extract data from TS-sets and to become candidates. Finally, device 11 sends a sequence of vacant read blocks to extract data from each candidate C-station. The described method implements a common duplex signaling channel in which individual station polling by device 11 is not required to detect activity and in which no station receives preferential treatment.

Figures 6, 10:
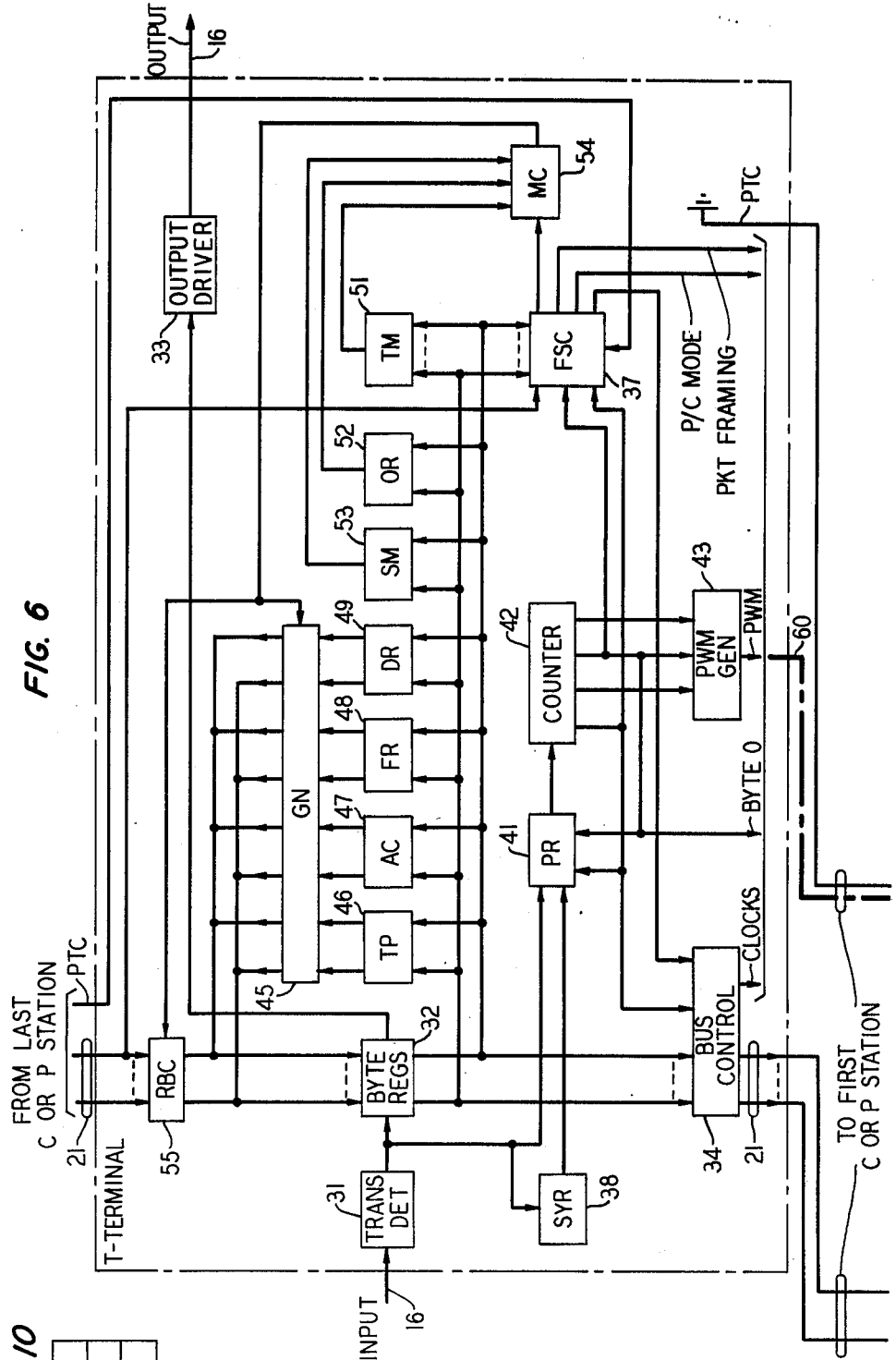
FIG. 6 is a block diagram of a T-terminal of FIG. 1.
FIG. 10 illustrates an arrangement of FIGS. 6, 8 and 9 to provide a connection of a C-station and a P-station respectively to a T-terminal.

FIG. 6 is a diagram of an illustrative T-terminal for the system of FIG. 1. Since the basic overall function of the system has been described, the individual components of the system, upon which the design is actually dependent, will be described from this point forward. In order to provide a proficient signal for synchronization purposes, which does not require code restraints or substitutions, the ring carrier signal presented to transition detector 31 utilizes transitions to indicate bit values in the digital signal. This type of transmission signal is encoded by a conventional method referred to as differential phase modulation similar to the Manchester method. More specifically, a transition indicates a "1" while the absence of a transition indicates a "0." Detector 31 converts the presence or absence of transitions in the ring carrier signal into instantaneous levels compatible with logic circuitry of the T-terminal of FIG. 6.

The output of detector 31 is applied to byte register 32 which delivers the signal to output driver 33. This completes the main signal path of the ring carrier signal through the T-terminal. If none of the associated C or P stations of the T-terminal are actively communicating or if no alteration of the signaling byte is required, the ring carrier signal travels through this path unaltered. Register 32 includes two registers that alternate roles on successive bytes. As one operates serially, the other register operates in parallel. The ring carrier signal, because of this operation encounters a two-byte delay in passing through each T-terminal.

While a byte is held in the parallel portion of register 32 for a terminal with associated active C-stations or P-stations, the byte is transmitted by enabling bus control (BC) 34 of parallel bus 21. Bus control 34 contains a set of transmission gates which are enabled by finite state circuit (FSC) 37. Bus 21 then applies this byte to all stations and the appropriate C-station or P-station interacts and returns a byte to register 32 via the return path of bus 21 from the last station. The signal in the parallel portion of register 32 will not be applied to bus 21 when that byte in the signal is not intended for any of the associated stations of a T-terminal. Bus control 34, in this case, is not enabled. So this signal is merely passed on until arrival at a subsequent T-terminal with active stations that communicate by utilizing the same technique as has been described. As may be apparent, parallel bus 21 is relatively high speed since the information in register 32 must be applied to a C-station and received therefrom in the interval while the next byte of the ring carrier signal is being applied to the serial portion of register 32.

The output of transition detector 31 is also applied to synchronizer (SYR) 38 which recovers the clock signal from the ring carrier signal. Phase resolver (PR) 41 receives the outputs of detector 31 and synchronizer 38. As previously mentioned, the ring carrier signal contains transitions to indicate the value of digital bits. Each bit has two equal periods called cells: the first period is cell zero followed by cell one. The occurrence of transitions in the ring carrier signal is at the beginning of each cell. Using T to indicate a transition and X the absence of a transition, the following will serve to locate the first bit of the signaling byte or framing bit amongst the other digital bits.

| Cell | : | One | Zero |
|---|---|---|---|
| Normal "1" bit: | | T | T |
| Normal "0" bit: | | T | X |
| Framing "1" bit: | | X | T |
| Framing "0" bit: | | X | X |

Thus, the zero cell of the first bit of each signaling byte at the beginning of a frame in the ring carrier signal is the only time a transition is absent whether that particular bit value is "1" or a "0." This unique occurrence is provided so that the circuitry of the system of FIG. 1 will maintain frame synchronization. The output of transition detector 31 has a rate corresponding to the cell clock rate. Phase resolver 41 locates the first bit in the signaling byte or byte zero at the beginning of each frame. The output of resolver 41 is a one phase at the bit rate used to drive counter 42. As is evident from FIG. 6, counter 42 includes a chain of cascaded dividers that produce outputs at various rates. PWM generator 43 utilizes these rates to produce two signal sequences of predetermined width pulse signals for the associated C-stations. A sequence of the ten PWM "1's" and eleven PWM "0's" is sent each time the opcode of "11" occurs. The eleventh PWM "0" not accompanied by a PWM "1" resets the active signaling status of the C-stations. Since the signaling byte is unique, counter 42 provides an output to the C-stations to indicate its occurrence for framing purposes.

Bytes of information in the parallel portion of register 32 are applied to a number of components in the T-terminal of FIG. 6. Among these components, through path (TP) 46, address changer (AC) 47, and registers 48 and 49 have outputs that are coupled back into register 32 via gating network (GN) 45. Gating network 45 contains a set of transmission gates for each of these components. The transmission gates are selectively enabled by appropriate outputs from multiplex control (MC) 54. The outputs from gating network 45 are used to change the contents of the signaling byte as required during the various signaling operations.

Upon the occurrence of a signaling byte having a leading "0" bit and a "10" write opcode field, address changer 47 increments the TID value before application to a subsequent T-terminal. If the TID field is all "1's" or all "0's," TID match (TM) 51 is latched to store the indication of the TID field match for the remainder of the signaling sequence of three successive frames referred to hereinafter as a signaling block. If a "00" vacant read opcode occurs at this time and neither the T-terminal nor any of its C-stations are signaling candidates, address changer 47 decrements the TID value for the subsequent T-terminal. If at least one C-station is a candidate, address changer 47 changes the opcode from "00" to "01" and a TID match is recorded by TM 51. The T-terminal becomes a candidate for service when external modification of its field register (FR) 48 or data register (DR) 49 occurs. A candidate C-station makes its candidacy known to the T-terminal by changing the opcode field from "00" to "01." In any case, the input opcode is recorded in opcode register (OR) 52.

SID match (SM) 53 becomes latched at the signaling byte to store the indication of SID field match if the leading two bits are "0," a TID match was earlier recorded, and one of two criteria is met. Either the recorded opcode is "10" and the SID field is all zeros or else the recorded opcode is "00," the T-terminal is a service candidate and none of the C-stations is a candidate. In the former case, the FLD field is latched into register 48. In the latter case, register 48 is padded with zeros in the SID field and loaded into the parallel portion of register 32. If the T-terminal is not a service candidate but TID match and an opcode of "00" was recorded, then a C-station must be a service candidate so information present on bus 21 is loaded into the parallel portion of register 32.

When the leading two bits of the frame are "11", TID and SID match were recorded and an opcode of "10" was recorded, register 49 is loaded with data. If the opcode is "00," the parallel portion of register 32 is loaded from either register 49 or bus 37 through return bus control 55 depending upon whether SID match was recorded or not.

The foregoing operations occur during the signaling byte. It should be apparent to those skilled in the art that relatively straightforward combinational logic plus a few latches, which include type-D flip-flops, are required to implement the components that provide these operations.

Operations during the information bytes after the signaling byte involve finite state circuit (FSC) 37. Although circuit communication has been almost exclusively discussed, an important function of circuit 37 is to locate the division of a frame between circuit and packet portions in the ring carrier signal produced by the system of FIG. 1. This division is provided by a dynamically movable partition (illustrated in FIG. 4) which is placed at the end of the circuit communication bytes. The circuit communication bytes are automatically packed at the front of the frame thus freeing a contiguous group of bytes following the partition for packet communication. The partition is made recognizable by each T-terminal simply by setting the M marker bit to a "1" value in the first packet byte emerging from device 11 of FIG. 1. Each T-terminal thus encounters zero or more bytes after the signaling byte with a "1" marker bit followed by at least one byte with a "0" marker bit. The next byte with a "1" marker bit is the first packet byte. The otherwise unused byte just preceding the first packet byte may be used for packet framing as will be evident when the packet communication feature of the system of FIG. 1 is discussed. Of course should the situation occur when all thirty one information bytes are used for circuit communication, the partition is simply omitted.

Figure 7:
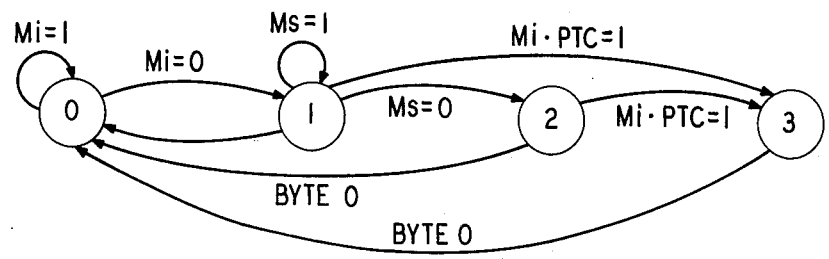
FIG. 7 is a diagram that illustrates the various states of circuit 37 of FIG. 6.

FIG. 7 is a diagram that illustrates the various states of circuit 37. Circuit 37 is reset to state 0 by the outputs of counter 42 upon the occurrence of the signaling byte of each frame. In state 0, the information bytes and certain of the synchronizing signals are not passed to the associated stations of a T-terminal if successive marker bits are "1's" ($M_i=1$). Accordingly, the logic circuitry of the stations is fixed at "0" levels and conserves power. The same arrangement is used to hold bus 21 at logical "0" level during the signaling byte if the TID field value is not matched at a T-terminal. This prevents interaction of inappropriate stations with the signaling channel. When a byte with a "0" marker bit arrives, bus 21 is activated by enabling bus control 34 and circuit 37 advances to state 1. Circuit 37 remains in this state so long as C-stations continue to change the marker bit from "0" to "1" ($M_s=1$) in successive bytes. For each information byte, information present on bus 21 is loaded into the parallel portion of register 32. When the marker bit remains at "0" levels ($M_s=0$) circuit 37 advances to state 2. Bus 21 is again disabled by controls 34 and 55 in response to the outputs of multiplex control 54. Circuit 37 advances to state 3 and enables bus 21 when a subsequent incoming byte with a "1" marker bit is detected provided a P-station is present and connected. A conductor PTC is "daisy-chained" through the P-station cascade to detect this situation at the T-terminal. Circuit 37 has an output applied to P-stations to alert them to the occurrence of the packet partition. Otherwise, circuit 37 remains in state 2. Circuit 37, as should be evident to those skilled in the art, requires only two flip-flops and a few gates to provide this operation.

Figure 8:
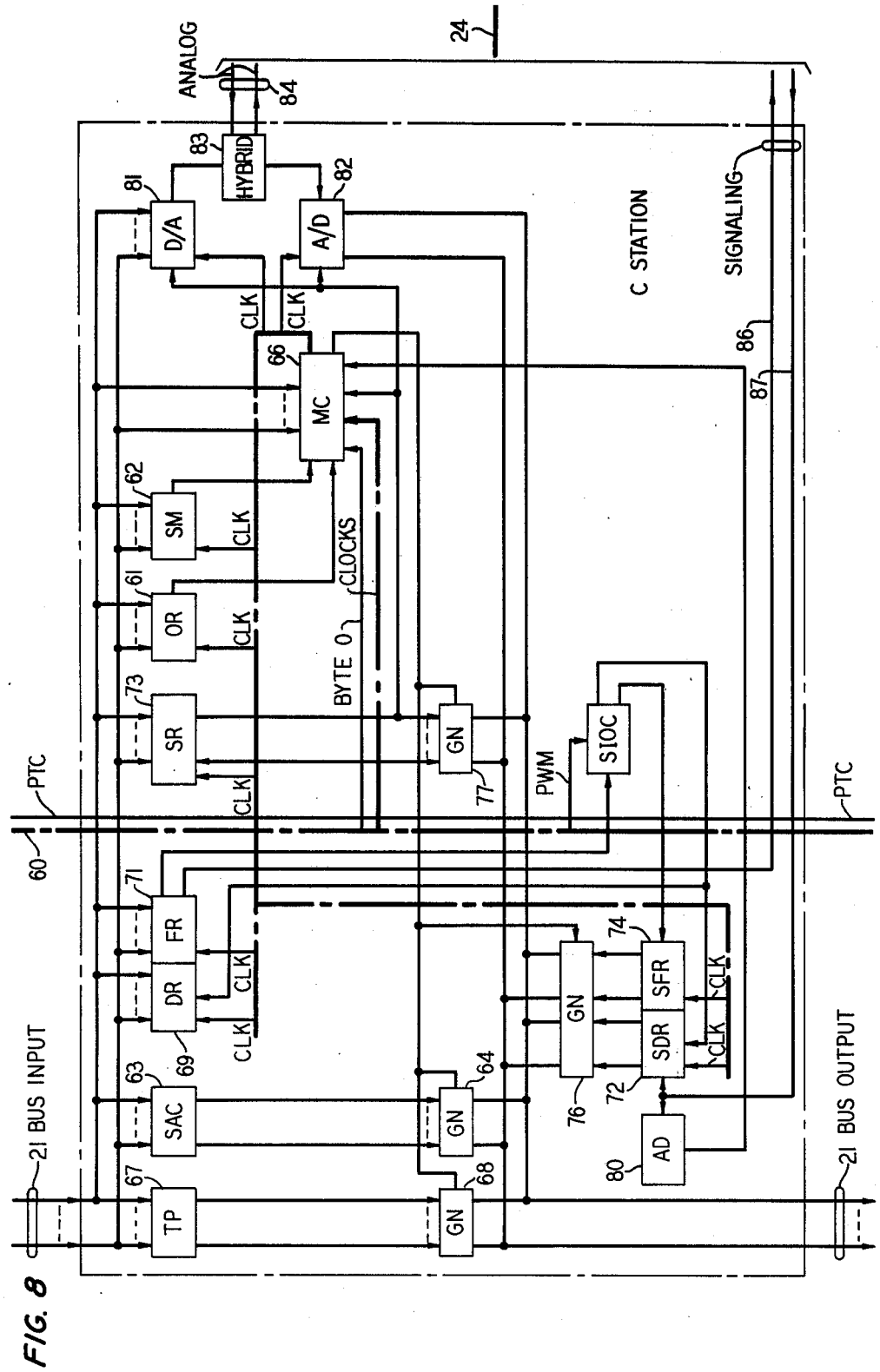
FIG. 8 is a block diagram of a C-station of FIG. 1.

In FIG. 8, a block diagram depicts an illustrative C-station to be used in the system of FIG. 1. FIG. 10 illustrates an arrangement of FIGS. 6, 8 and 9 to provide a typical connection of a C-station and a P-station respectively to a T-terminal. As previously mentioned generally with regard to the relative association of C-stations and P-stations to a T-terminal, the positions of FIGS. 8 and 9 in FIG. 10 may be interchanged. Also, the addressing capacity of the signaling channel provides the limitation on the number of C-stations and P-stations associated with a particular T-terminal. The occurrence of a signaling byte is communicated to the associated C-stations for synchronization of the system. This information is present at the input from multiple conductor 60 of a T-terminal.

Before proceeding with the discussion of the internal circuitry of the C-station, there are some registers in the C-station which provide similar functions to registers in the T-terminal. These include opcode register (OP) 61 and SID match (SM) 62 in the C-station which provide functions equivalent to OP 52 and SM 53 in the T-terminal of FIG. 6. For example, the former set of registers come into play when the SID field at a particular C-station is "1111" while the latter become operative at the T-terminal when the SID field is "0000." Station address changer (SAC) 63 modifies the 4-bit SID field similar to the way in which address changer 47 alters the 6-bit TID field. In this case, the terminal apparatus functions at a higher level of hierarchy than the station apparatus. Since the number of possible decisions to be made at the lower level is less, the C-station apparatus is not as complex.

When the leading bit of the signaling byte is a "0," the sole signaling function is to record the opcode in register (OR) 61. If the opcode is "10" or write and the leading bit pair of the next signaling byte is "10," station address changer (SAC) 63 increments the SID field value. Gating network 64 is enabled by multiplex control (MC) 66 to pass the incremented station identifier field to bus 21 for subsequent C-stations. Also present in the same signaling byte is a three bit field (FLD) which is passed unmodified by through path (TP) 67 and gating network (GN) 68 for the remaining C-stations. At the particular C-station at which the incremented SID field is "1111," SID match (SM) 62 becomes latched and the value of the FLD portion of the signaling byte loaded into FLD register (FR) 71. On the other hand, if the recorded opcode is "00" indicative of a vacant read and the C-station is not a signaling candidate, station address changer 63 decrements the value of the SID field which is applied to bus 21. The C-station may become a signaling candidate in one of two ways. First, information is received from its attached TS-set and applied to station data register (SDR) 72 and station FLD register (SFR) 74. Second, status register (SR) 73 has data to be sent to device 11 of FIG. 1. Attached TS-sets take precedence over the T-terminal. If the C-station is a candidate, SID match (SM) register 62 is latched and the SID field passes unmodified, either the contents of register 74 or a field value of "111" is applied to bus 21 and the first two bits of "10" are changed to "11." This is accomplished by multiplex control 66 enabling gating network (GN) 76. When the leading bit pair is "11" and a SID match is recorded, the A bit of the final signaling byte of a block which is illustrated by line C in FIG. 4 is inverted. If the recorded opcode is "10" (write) the data is loaded into status register (SR) 73, provided the previously loaded value of the FLD field is "111," or else into data register (DR) 69 if the FLD field value is other than "111." If the recorded opcode is "00" (vacant read) then data from either register 73 of register 72 is applied to bus 21 by respectively enabling gating network 77 or 76.

Status register 73 interacts with the DATA field when the FLD field value is "111." If the most significant bit (MSB) is a "1," register 73 is loaded with the five remaining bits of the DATA field. On the other hand, a "0" MSB indicates that register 73 is to become a service candidate. The least significant bit (LSB) of register 73 determines whether digital-to-analog (D/A) converter 81 and analog-to-digital (A/D) converter 82 are to become operative to couple the attached TS-set logically to one of the information bytes. The analog signal path from converters 81 and 82 to the TS-set includes hybrid 83 and two-wire circuit 84.

With the C-station logically connected, converters 81 and 82 transact data with bus 21 in accordance with the operation previously described as occurring in the system of FIG. 1. As may be appreciated since the byte time slot in which the transaction takes place varies, converters 81 and 82 include double-rank buffers or registers. Rank transfers occur with the signaling byte at the beginning of the next successive frame to prevent byte slippage and changes in transmission delay. Any of a number of conventional D/A and A/D converters may be readily utilized by those skilled in the art to serve as converters 81 and 82.

If either an alert pulse at alert detector (AD) 80 has been received from the TS-set or registers 69 and 71 have been loaded during a previous signaling block then the sequence of PWM pulses from the T-terminal initiates transmission to the TS-set over data send pair 86 and clocks the signal returned on data receive pair 87 into registers 72 and 74.

It should be noted that details of the TS (telecommunication sets) of FIG. 2 have been omitted. Basically the TS-sets include a signaling interface associated with a number of telephone sets which are all of straightforward implementation and may be readily designed by those skilled in the art. The particular design would primarily be a function of the type of service features these sets would provide. In any case, it is anticipated that the flexibility built into the signaling channel is sufficient and capable of providing such features.

Figure 9:
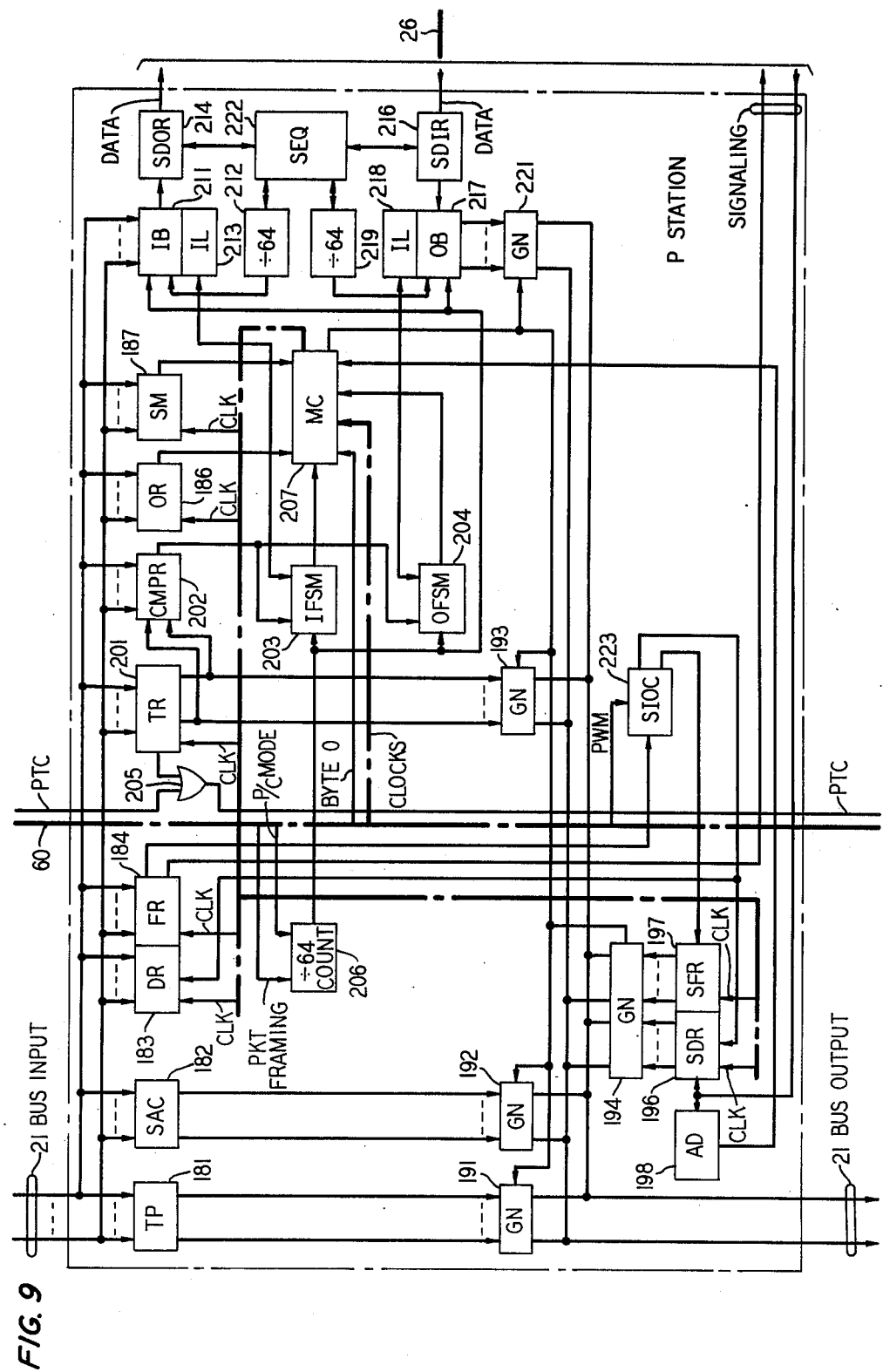
FIG. 9 is a block diagram of a P-station of FIG. 1.

FIG. 9 will be described later in connection with the data or packet communication utilization of the remaining portion of the frame of the ring carrier signal.

Figure 11:
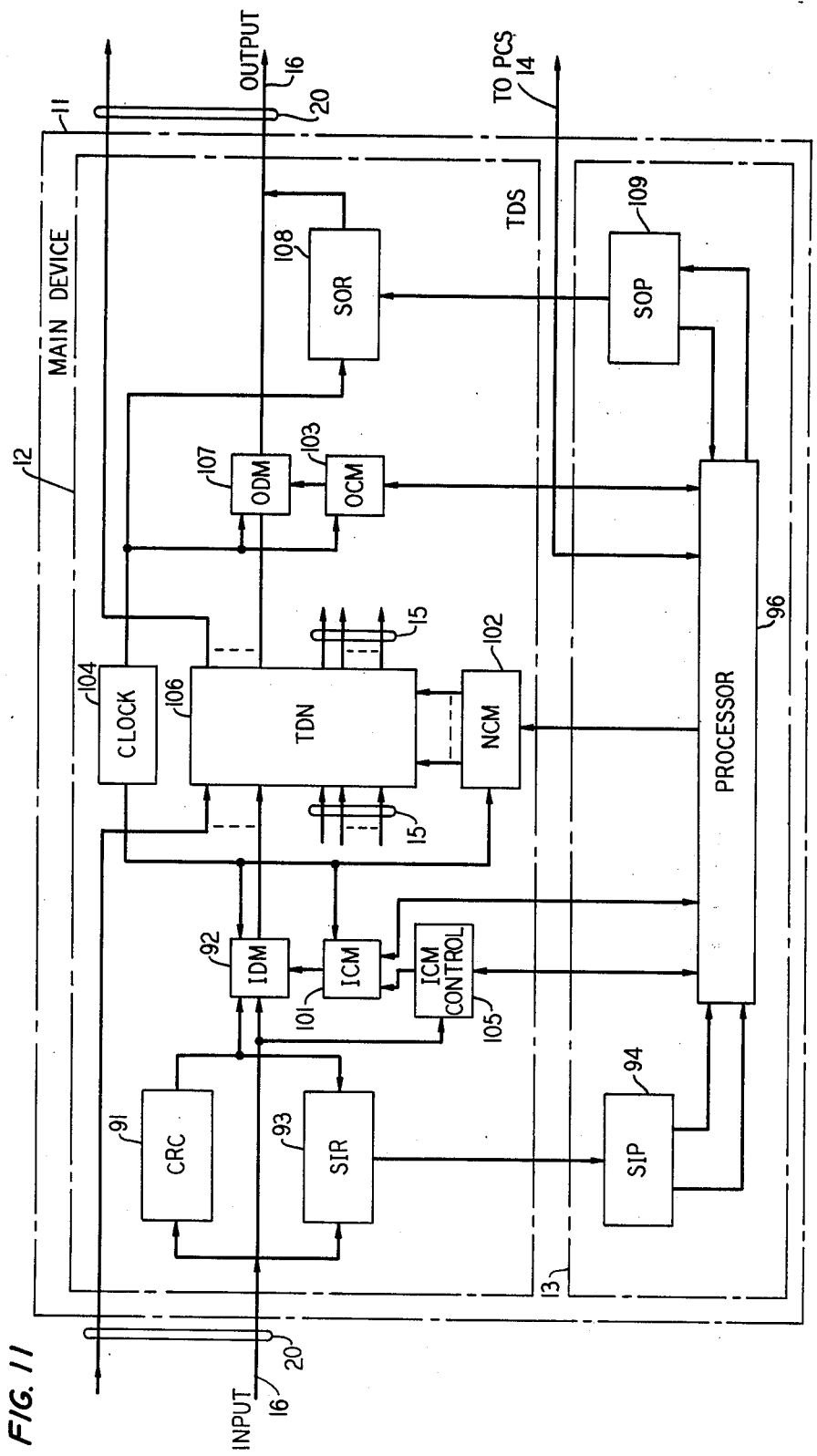
FIG. 11 is a block diagram of Main Device 11 of FIG. 1.

FIG. 11 depicts the general arrangement in device 11 for providing circuit communication that features dynamic byte allocation and automatic packing behind the signaling byte in the frame of the ring carrier signal. The internal arrangements of data memories 92 and 107 and control memories 101 and 103 which are used to change the ring carrier signal frame are not shown in FIG. 11. These arrangements will be discussed in connection with FIGS. 12 and 13.

The input signal from the ring is applied to TDS switch 12 whose input portion includes clock recovery circuit (CRC) 91, input data memory (IDM) 92, and signaling input register (SIR) 93. Circuit 91 extracts timing information from the ring carrier signal and serves to clock successsive information bytes of this signal into sequential byte locations of memory 92. The signaling byte of each returned frame is gated into register 93 and stored until application to processor 13. Within processor 13, signaling input processor (SIP) 94 converts the input signaling information into a compatible format for main processor (MP) 96. In switch 12, processor 96 provides processing information for input control memory (ICM) 101, network control memory (NCM) 102 and output control memory (OCM) 103. Disposed between ICM 101 and processor 96 is ICM control 105 which serves to coordinate timing operations. Operation of all the memories in switch 12 except for the reception of the returned ring signal is synchronized to the output of office clock (OC) 104.

In the case of intraring communication, the information bytes in memory 92 are applied via time division network (TDN) 106 to output data memory (ODM) 107. As previously mentioned, switch 12 provides a store-switch-store type operation. The input storage is provided by memory 92 while the storage on the output side is provided by memory 107. Information bytes from the ring or to the ring are respectively read into or read out of each of these memories in or from successive storage locations. Information bytes, however, for or from network 106 are read out or read in memories 92 and 107 in accordance with the address information respectively supplied by memories 101 and 103. In other words, information bytes are obtained from memory 92 in a sequence which is different from the sequence in which the information was read into this memory. The converse situation applies to memory 107. Network 106 is a gated network which is selectively enabled by memory 102 to provide a transmission path for each one of the information bytes of the frame from a predetermined one of the input terminals to a predetermined one of the output terminals.

During intraring communication a given information byte will pass through network 106 between corresponding input and output terminals 20 which are associated with the same ring. If, on the other hand, interring communication is being provided by network 106, the appropriate information bytes from one input terminal are directed to different output terminal corresponding to another ring from that which information byte originated. In addition to memory 107, the output portion of switch 12 includes signal output register (SOR) 108 which is loaded with output signaling information by signaling output processor (SOP) 109 of processor 13. It should be noted that each ring or loop associated with switch 12 requires its own input and output portions in the switch which would also include control memory apparatus associated with the data memory apparatus. This would provide separate clock recovery for each loop, however, the operation of processor 13 and network 106 may be readily shared.

Figure 12:
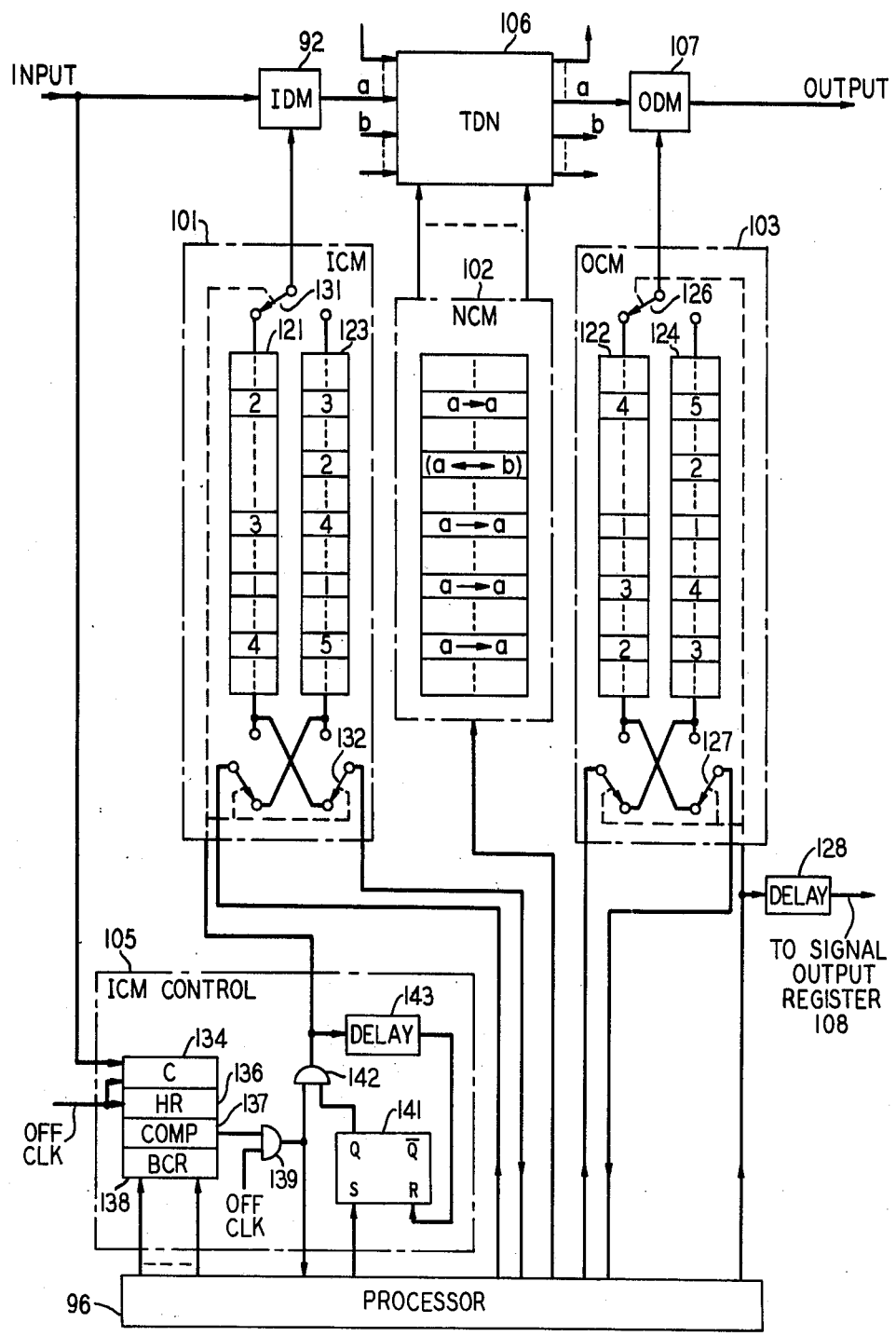
FIG. 12 is a block diagram of control memories 101 and 103 in FIG. 11.

In order to obtain a full appreciation of the operation of switch 12, the internal designs of input and output control memories 101 and 103 should be considered along with the input and output data memories 92 and 107. FIG. 12 therefore depicts the internal arrangement of control memories 101 and 103 while FIG. 13 similarly depicts data memories 92 and 107.

In FIG. 12, control memories 101 and 103 are each divided into two portions or sections. From the operating point depicted in FIG. 12 sections 121 and 122 are the on-line sections. The on-line sections carry this designation since they are each interacting with their respective data memory and may be read by processor 96. Sections 123 and 124 are off-line sections since they, at this point in time, are only interacting with processor 96. Each of sections 121-124 is a complete read/write random access memory including associated apparatus, not shown, for accepting and delivering successive information bytes in parallel form. In accordance with the example of the active communication process described in FIG. 3, each rectangular division in sections 121-124 represents the storage location of address information in the memory with the value of the number indicating the byte in the associated data memory to be read or written during the cross-office time slot. Connection of an additional C-station such as C-station Oi requires section 124 of memory 103 must be updated by loading it with new information so that the information bytes for telecommunications calls in progress will be loaded at the proper locations within memory 107. This is accomplished simply by adding one to each entry for a C-station more distant from device 11 than the C-station to be added. Then a connect order issued upon occurrence of the signaling byte operates switches 126 and 127 to reverse the roles of the sections of memory 103. One frame later at the output of delay 128 the connect order is signaled to C-station Oi so that it may begin extracting the information bits from the second information byte. At this time the data to other communicating C-stations is transmitted without interruption. When the first altered frame arrives at switch 12 after propagating through the T-terminals on its loop a similar change of roles occurs for sections 121 and 123 of memory 101.

To effect this change of roles at the proper time between the sections of memory 101, ICM control 105 is shown in FIG. 12 which generates a control signal for switches 131 and 132 of the memory. This circuit includes counter (C) 134, holding register (HR) 136, comparator (COMP) 137, and byte counter register (BCR) 138. The output of register 137 along with the office clock signal is applied to AND gate 139. The output of AND gate 139 provides an error report signal, simply by counting the number of marker bits in each returned frame at the front of each information byte changed in polarity, i.e. from "0" to "1." In accordance with the signaling procedure a change in the number of marker bits wil be expected. However, if such a change does occur without the aid of the signaling procedure, an error is indicated by the output of AND gate 139. Also, present in this circuit is RS flip-flop 141 whose Q output is applied to AND gate 142 in conjunction with the output of gate 139. The output of gate 142 provides a control signal which reverses the positions of switches 131 and 132. A deferred version of this signal is used to reset flip-flop 141 via delay 143.

In operation, the off-line section of memory 101 is pre-loaded with information applicable to the altered frame. Then register 138 has the correct byte count for the unaltered frame. No further action takes place until the frame is again altered. When a newly altered frame occurs, the sections of memory 101 switch roles and flip-flop 141 is reset.

In FIG. 12, the table in memory 102 represents completion of signal paths between input and output terminals of network 106. In this operational example, the C-station just added on ring a is to communicate with a station on ring b. Connection of the second C-station requires a separate call setup sequence to be performed within that ring. When the second C-station is connected, cross office exchange of information is initiated by appropriate entries in memory 102. The call release is accomplished by first removing the cross office connection and then disconnecting each of the C-stations involved. Disconnection of the C-station involves updating the off-line section of the input control memory and output control memory on its ring and then switching the on-line and off-line sections to change roles by the same process used for the connection.

Figure 13:
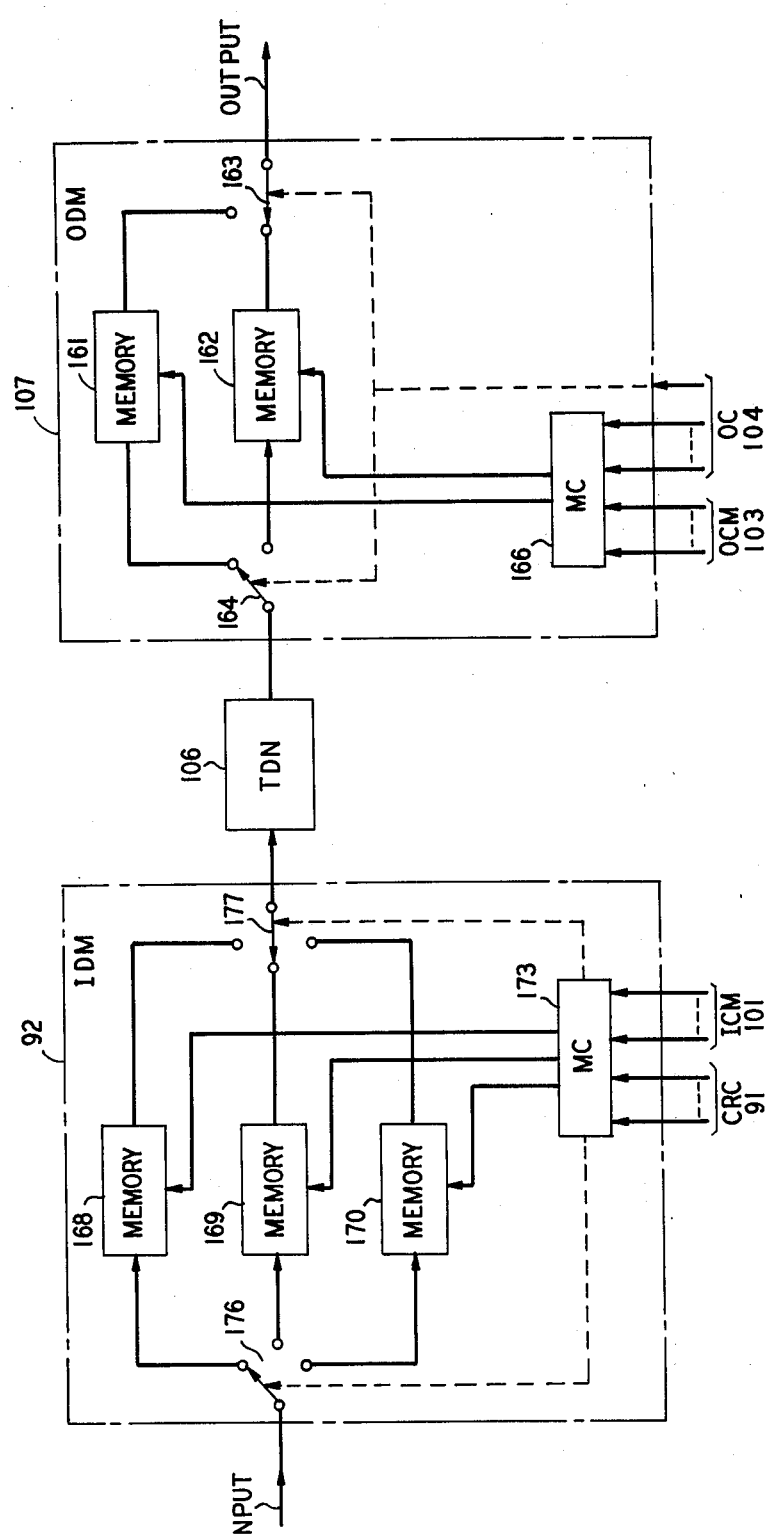
FIG. 13 is a block diagram of data memories 92 and 107 of FIG. 11.

FIG. 13 illustrates the sectional internal arrangements of data memories 92 and 107 which are instrumental in providing the continuous updating utilized in the dynamic channel allocation process. Since output data memory 107 comprises two sections 161 and 162 each of which is complete read/write random access memory instead of the three sections at input data memory 92, the simpler case of memory 107 will be described first. Each of the sections in memories 92 and 107 has sufficient storage capacity to retain a complete frame of information bytes in the ring carrier signal. In each frame one of sections 161 and 162 is read or unloaded to provide the information bytes in the frame of the ring carrier signal while the other section is being written into or loaded by the output of network 106.

Upon the occurrence of the signaling byte at the start of the next frame, office clock 104 issues a signal which changes the position of switches 163 and 164 to reverse the roles of sections 161 and 162 so that section 162 is the loading section instead of section 161 as indicated in FIG. 13. In accordance with the function of sections 161 and 162, multiplex control (MC) 166 provides address signals. More specifically, the section of memory 107 that is being loaded is the loading section which is provided address information by the on-line section of output control memory 103 indicated in this case in FIG. 12 as section 122. The other section or unloading section of memory 107, in this instance, is section 162 which is provided regularly ordered sequential address signals from control 166 derived from the output of office clock 104 in FIG. 11. When the roles of sections 161 and 162 switch, the address signals provided by the output of control 166 change so that the loading section is now section 161 and is provided address information from control memory 103 of FIG. 12 while the unloading section is section 162 which is furnished sequential address signals by control 166.

In accordance with the updating process of dynamic channel allocation, the relative delay between the cross office time slot and the ring time slot of an information byte changes. If memory 107 had only one section, information bytes would be dropped or repeated producing byte slippage during changes in relative delay. the utilization of two sections in memory 107 avoids byte slippage and enables call setup/release operations to take place without interrupting active communication. Therefore, the flexibility of this arrangement in memory 107 allows channel assignment changes to be made for a complete frame while preserving the information byte integrity within each frame.

Unlike the direct relationship present at the output of network 106 as being the input to the ring carrier signal, the input to network 106 is subject to variable delay in the returned ring carrier signal. Large variations in this delay are due to the service flexibility provided by changing the number of T-terminals present in a particular ring. Small variations in delay are also encountered because among other factors the speed of propagation is also somewhat temperature dependent. Accordingly, the three sections 168–170 in memory 92 provide more flexibility in the variable timing between the recovered frame and the central office frame.

Figure 14:
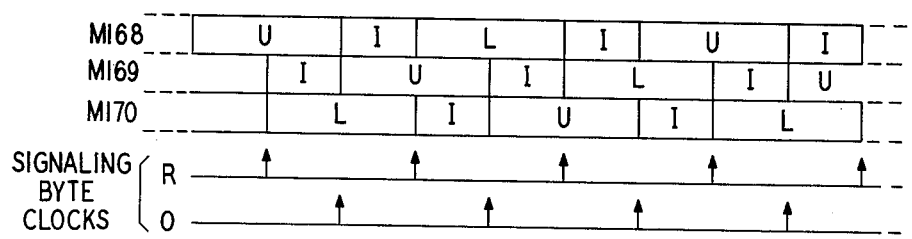
FIG. 14 illustrates how the memory units 168-170 of FIG. 13 are operated by control 173.

FIG. 14 illustrates the manner in which sections 168–170 are administered to prevent information byte slippage by omissions or repetition of bytes. As indicated in FIG. 14 at every instant, one section of memory 92 is being loaded with information bytes from the returned frame of the ring carrier signal, a second section is being unloaded to provide the input to network 106, and a third section is idle. Multiplex control (MC) 173 provides regularly ordered sequential address signals to the loading section of memory 92 derived from clock recovery circuit 91 of FIG. 11. Nonsequential address signals are provided by the on-line section of input control memory 101 of FIG. 12. The functions of the sections in memory 92 switch in accordance with the occurrence of the signaling byte of the recovered clock or office clock as appropriate. These clock signals are also depicted in FIG. 14. As may be appreciated, control 173 provides a first control signal derived from the recovered clock signal to switch the position of input switch 176 and a second control signal based on the office signal to activate changes in the position of output switch 177.

Now that the queued form of circuit communication has been described, the data or packet communication will be described. In the main device 11 of FIG. 1, packet communication subsystem (PCS) 14 communicates with the P-stations and associated DT-sets on the rings, such as ring 16, served by the main device. This communication path includes a set of ports 15 which connects subsystem 14 to switch 12, gated signal paths completed through the switch, and a set of ports 20 wherein a corresponding pair of ports provide the outgoing and return connections to a ring. In some system applications, it may be more convenient to locate subsystem 14 at a location distant from device 11 in which case digital trunks would provide the connection between the subsystem and the device including signaling paths between the subsystem and processor 13. Susbystem 14 provides the packet communication autonomously in the portion of the frame of the ring carrier signal following the movable partition which is illustrated in FIG. 4.

Subsystem 14 includes its own processor which communicates with processor 13, input and output gating networks coupled to ports 15, and a common pool of buffers fo providing both the data storage and the signal coupling paths between the gating networks within the subsystem. The general configuration of subsystem 14 provides an expanded switch-store-switch function about switch 12 wherein the networks of subsystem 14 are serial time-division networks operated by control memories in the subsystem associated with each port of the switch. These networks load selected buffers from selected output ports 15 of switch 12 and unload selected buffers via selected input ports 15 of the switch. While this operation is going on, the processor of subsystem 14 communicates with processor 13 and interacts with the packet header.

One of a number of conventional multiplex control protocols is employed so that P-stations arranged according to FIG. 9 provide the interaction between the DT-sets and the ring carrier signal. An example of multiplex control protocol is disclosed in U.S. Pat. No. 3,985,962 issued to Jones et al on Oct. 12, 1976 wherein a suitable header and attendant method of information transmission is disclosed. Buffer storage is employed in the P-station to provide flexibility in data rates as well as the store-and-forward feature of packet communication between DT-sets and the ring carrier signal. Since the DT-sets including their connection with the P-station is application-oriented and well within the skill ofthose in the art, interfacing circuitry will not be disclosed.

Although signaling may be provided in a number of ways, the selected option resorts to the common signaling channel for interacting with the P-stations in the same manner as the circuit communication. After the DT-sets and P-stations are connected via the signaling channel, the FSC circuits 37 (FIG.6) in their respective T-terminals locate the partition in the ring carrier signal. At least one information byte with a marker bit of "0" must occur before the partition with a 37 1" market bit. The packet channel now formed is shared in much the same way as the signaling channel. Since all P-stations interact as though logically connected in cascade, the incremental addressing technique used for circuit communication is not suitable. Instead the logically connected P-stations are assigned a multibit address tag using the signaling channel (FIG. 5 line C) which is stored at the P-station. This assignment is done by device 11 which retains a ring "map" of the system. Each packet includes a number of bytes up to a predetermined maximum associated with a header of bytes. The header includes the address tag and other control information which provides multiplexing control information. since the signaling channel connects the P-station to provide a virtual channel. Another conventional feature of the header is to provide a desired level or some type of priority of service during contention amont active P-stations when they are competing to use the portion of the ring carrier signal available for packet communication.

FIG. 9 is an arrangement utilized for the P-stations. In the P-stations, there are a number of components which interact with the signaling channel and are identical with the C-stations. These include through path (TP) 181, station address changer (SAC) 182 data register (DR) 183, field register (FR) 184, opcode register (OR) 186, SID match (SM) register 187, gating networks (GN) 191-194, station data register (SDR) 196, station field register (SFR) 197, and alert detector (AD) 198. Tag register (TR) 201 which serves as the internal status register of the P-station is equivalent to SR register 73 of the C-station.

Register 201 receives the address tag assigned by device 11 through the signaling channel which is retained and applied to one input of comparator 202. Thereafter, comparator 202 matches the content of register 201 with the address in the header to identify data packets in the ring carrier signal transmitted for this particular P-station. The output of comparator 202 is applied to input finite state machine (IFSM) 203 and output finite state machine (OFSM) 209 which interact with the packet header. In the T-terminal of FIG. 6 to which the P-station is associated, finite state circuit 37 whose logic function is illustrated in FIG. 7 issues a pules on the packet (PKT) framing line in bus 60 to signal the start of a packet. In this case, the T-terminal circuitry examines the otherwise unused signaling byte for all "1's" to indicate the start of a packet. When this signal is received at the P-station, counter 206 locates the header in the packet. A P/C mode line in bus 60 presents a level signal to enable counter 206 during the packet portion of the frame in the ring carrier signal. For alerting the T-terminal that a P-station is present and connected, the PTC line is looped through all the P-stations and returned to the T-terminal. If a logical one is returned by any P-station by the operation of their OR gate 205, then the T-terminal is aware of this condition.

State machines 203 and 206 among other components in the arrangement of FIG. 9 provide inputs to multiplex controller 207 which coordinates the activities of P-station with those of the ring and the DT-terminal connected by bus 25 to the P-station. Data extracted from the ring by the T-terminal and placed on bus 21 is received at the header addressed P-station by input buffer (IB) 211 which has a storage capacity of at least two packets. In this case, each packet includes sixty-four bytes although the selection of packet size is primarily a matter of reasonable design choice related to other system parameters and terminal applications. Since the packet size exceeds the frame size, it will take more than one frame of the ring carrier signal to complete a data packet. Counter 212 provides addressing sequences for buffer 211 which has interlock (IL) 213 connected thereto for directing data to the empty portion of the buffer. The output of buffer 211 is applied to serial data output register (SDOR) 214 to feed the DT set via bus 25. At the input side of the DT-set is a similar arrangement of serial data input register (SDIR) 216, output buffer (OB) 217, interlock (IL) 218, counter 219, and also gating network (GN) 221 which provides the signal path for the data back to bus 21.

In operation, data is accepted by the P-station as routed to it from the T-terminal on bus 21. The data is fed to and returned from the associated DT-set one byte at a time using control bits. Coupled to registers 214 and 216 is sequencer 222 which examines the control bits to ascertain acceptance by the DT-set before another byte is sent to it. Similarly, sequencer 222 provides this function for the reverse flow of data. Data flow in both directions is therefore controlled by the user's DT-set. The advantage of this arrangement of data transport is that the different types of DT-sets utilized may fall within a wide range of user terminal rates without any circuit modification. Signaling between the P-station and DT-set is also performed and coordinated using signaling input output controller (SIOC) 223.

It is to be understood that the system arrangement and various components in the system as described in the foregoing are merely illustrative of the application of the principles of the invention. Many of the parameters of the system design, among which are number of terminals, stations, frame and packet size, are application dependent and may therefore be readily changed to suit a given application. Furthermore, the concept of packing the circuit communication signal bytes into a contiguous group only requires that a common signal channel exists in some form. Moreover, the inventive principles may be readily modified to place the contiguous group of circuit communication bytes at the end of the frame of the ring carrier signal. Such changes, including numerous and varied other arrangements, may be utilized by those working in the art without departing from the spirit and scope of the invention.

I claim:

1. A multichannel digital communication system employing circuit-switched messages and store-and-forward messages among stations each associated with one of a plurality of terminals, said system comprising:

a control terminal and a transmission loop serially connecting together said plurality of terminals, said control terminal providing recurring frames for communication on said loop, and each of said frames including a predetermined number of signal bytes each having a predetermined number of binary digit time slots;

said stations being of a first type which communicate using messages that are circuit-switched and of a second type that use store-and-forward messages to communicate over said transmission loop in said frames; and said control terminal comprising a time division switching network of the store-switch-store type for interchanging the order of signal bytes in an incoming frame with respect to an outgoing frame, said control terminal producing a contiguous group of circuit-switched message bytes occupying a first contiguous portion of said frame wherein the order of the successive circuit-switched message bytes corresponds to the position of the stations of said first type on said loop with said terminals that are actively communicating in said system, the remainder of said frame produced by said control terminal providing a second contiguous portion for use by said second type of stations for communication by store-and-forward messages, and said control terminal providing a predetermined byte in each frame as a signaling channel common to all of said stations for selectively activating stations.

2. A system in accordance with claim 1 wherein said control terminal includes a marker bit and a plurality of information bits in each circuit-switched message that are each destined for one of said first type of activated stations and has a marker bit of a first polarity that is changed to a second polarity by the receiving one of said stations so that each of the activated stations extracts information bytes with the first circuit-switched message byte it receives with a marker bit of said first polarity.

3. A system in accordance with claim 2 wherein said control terminal issues a marker bit of said second polarity in the first signal byte of a store-and-forward message after issuing an extra signal byte with a marker bit of said first polarity following the circuit-switched message bytes to indicate the store-and-forward message portion of said frames.

4. A system in accordance with claim 3 wherein said control terminal comprises output memory means for providing frames for said loop, input memory means for receiving said return frames from said loop and gating means for completing signal paths between said memory means for the signal bytes in the frames.

5. A system in accordance with claim 4 wherein said output memory means comprises a plurality of memory sections each capable of storing a complete frame of signal bytes, one of said sections receiving signal bytes of one frame from said gating means while another one of said sections is being read to provide the signal bytes of the immediately preceding frame for said loop.

6. A system in accordance with claim 5 wherein said input memory means comprises three memory units and switching means for connecting all of said units so that one of said units is temporally connected to said loop to receive the signal bytes of a returned frame, another one of said units is temporally connected to said gating means to provide the signal bytes for the immediately preceding frame, and a third one of said units temporally stands idle ready to assume one of the connections and the corresponding function of either one of said two other units that is to commence first for the next successive frame of signal bytes.

7. A system in accordance with claim 6 wherein store-and-forward messages originating from said second type of stations are placed on said loop and sent to said control terminal, said control terminal having a subsystem having a switch-store-switch configuration forming a loop around said gating network and capable of storing complete store-and-forward messages to be forwarded by said control terminal to another one of said second type of stations.

8. A system in accordance with claim 7 wherein each of said plurality of terminals includes storing means to provide a signal path through it to complete said transmission loop.

9. A system in accordance with claim 8 wherein each of said plurality of terminals has busing means for connecting the stations associated to it with said storing means, said storing means includes two registers each capable of retaining a signal byte, one of said registers serially receives the third signal byte in a sequence of three successive signal bytes from said transmission loop while supplying the first signal byte in said sequence to the transmission loop extending beyond said storing means as the other one of said registers retains the second signal byte of said sequence and supplies it in parallel to said busing means, and said registers alternate roles on the next successive signal byte after said sequence.

* * * * *